Dec. 22, 1970   A. G. ROHNOW   3,548,524
DISPLAY DEVICE

Filed March 18, 1968   2 Sheets-Sheet 1

ALAN G. ROHNOW
INVENTOR

Huebner & Worrel
ATTORNEYS

Dec. 22, 1970     A. G. ROHNOW     3,548,524
DISPLAY DEVICE

Filed March 18, 1968     2 Sheets-Sheet 2

ALAN G. ROHNOW
INVENTOR

Huebner & Worrel
ATTORNEYS

United States Patent Office 3,548,524
Patented Dec. 22, 1970

3,548,524
DISPLAY DEVICE
Alan G. Rohnow, Turlock, Calif.
(1701 Holly Drive, Lodi, Calif. 95240)
Filed Mar. 18, 1968, Ser. No. 713,733
Int. Cl. G09f 11/02
U.S. Cl. 40—77.8                                        10 Claims

ABSTRACT OF THE DISCLOSURE

An easily assembled and disassembled display device consisting essentially of an outer tube mounted on detachable friction fitted end supports and having an elongated window through which information on a rotatable inner tube is displayed. The device includes features of construction providing for interlocking the parts by a retaining strip holding an information sheet on the inner tube, and for stacking of a plurality of the devices vertically by means of mating formations on the end supports.

BACKGROUND OF INVENTION

The present invention relates to display devices of the types shown and described in U.S. Pats. Nos. 97,974; 518,725; 698,141; 914,439; 973,403; 1,153,539; 1,414,436; 2,477,392; 2,488,271; 2,533,569; 2,624,140; 2,630,271; 2,646,220; 2,970,758; 3,028,082; 3,144,990 and 3,298,604 and more particularly to a device for readily presenting in a facile manner information or data indicating the costs of different amounts of variously priced items or materials, such as prescription medications. Heretofore, the actual multiplication of the prices times the quantities had to be performed or such information has been presented in transverse lines divided into columns on a plurality of pages or sheets of paper, necessitating turning of the sheets and the use of a ruler or the like to insure accurate reading of the information.

SUMMARY OF INVENTION

It is therefore an object of the present invention to provide for support of each sheet of information on a rotatable roller and display of each transverse line thereof through an elongated viewing aperture for ready presentation of the information in a facile manner.

Another object is to provide a display device made up of several parts easily disassembled and assembled for changing the sheets of information as necessary.

Another object is to provide for easy attachment and detachment of the information sheet by means which also serve to interlock several of the parts to insure unitary movement thereof.

Another object is to provide a display device with end supports having interlocking elements whereby several display devices may be superimposed or stacked one upon another to present information on several sheets.

Another object is to provide a display device constructed of relatively inexpensively readily available materials.

The aforementioned and other objects and advantages are attained by a display device including a cylindrical tube fitted at its ends to a pair of end supports on which a second tube disposed within the first tube is mounted for rotation. The second tube has attached thereto a sheet of paper bearing prescription information to be presented through an elongated window or viewing aperture in the first tube. A magnifier is mounted in the window for easier reading of the information. The prescription information or other information is arranged in columns on the sheet of paper, the outer tube bearing indicia which provide headings for the columns and identify the information therein. Additionally, the information is arranged transversely so that the information presented through the window relates to a particular prescription medication fee schedule. The second tube has a groove or slot extending the length thereof which is adapted to receive the overlapping ends of the sheet of paper. The paper is held to the second tube by a retaining strip fitting snugly in the groove and having bent ends receivable in notches formed in end plates which close off the ends of the tube, each end plate having a pin or stub shaft rotatably mounted in an adjacent end support of the first tube and carrying a finger knob. Each end support of the first tube has convex and concave surfaces and is formed with a pair of arcuate legs and a pair of openings, each leg having a projection or stud adapted to be received in an opening in an end support of a display device disposed therebelow for stacking a plurality of the display devices.

DESCRIPTION OF EMBODIMENT

Figure 1:
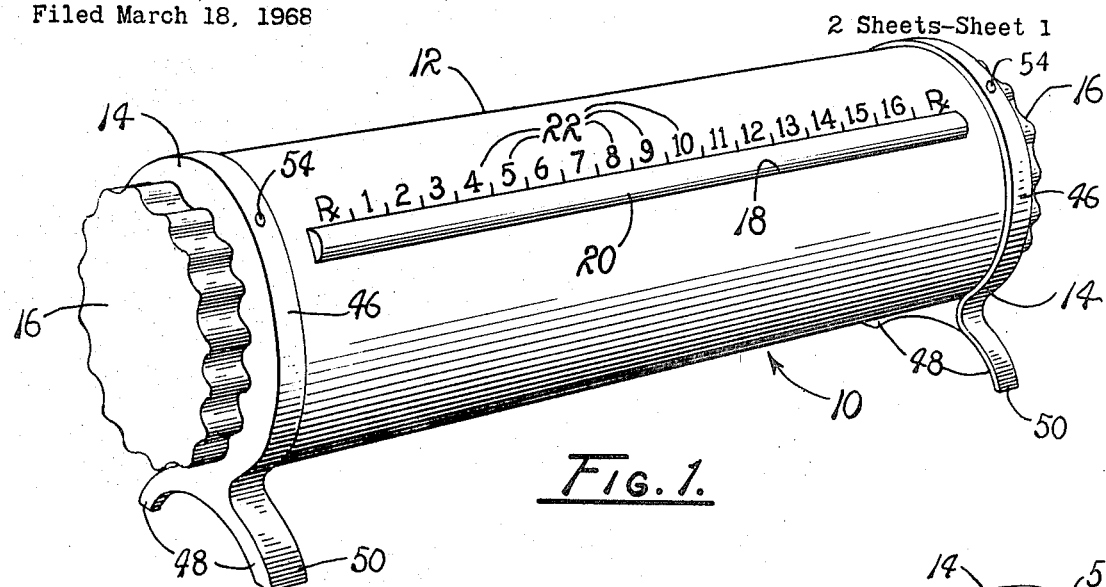
FIG. 1 is a perspective view of a display device embodying the principles of the present invention.

Referring to the drawings, there is illustrated in FIG. 1 a display device embodying the principles of the present invention and designated generally by reference numeral 10. The display device consists essentially of a tubular housing or outer tube 12, the ends of which are frictionally fitted to a pair of standards or end supports 14 beyond each of which is a finger knob 16 for rotating an information roller later described. The roller is adapted to bear information or data viewed through an elongated window or viewing aperture 18 provided with a magnifying lens 20 for easier reading of the information. The tube 12 also bears heading indicia 22 arranged over the window 18 coextensively therewith for identification of the information or data viewed therethrough.

Figure 2:
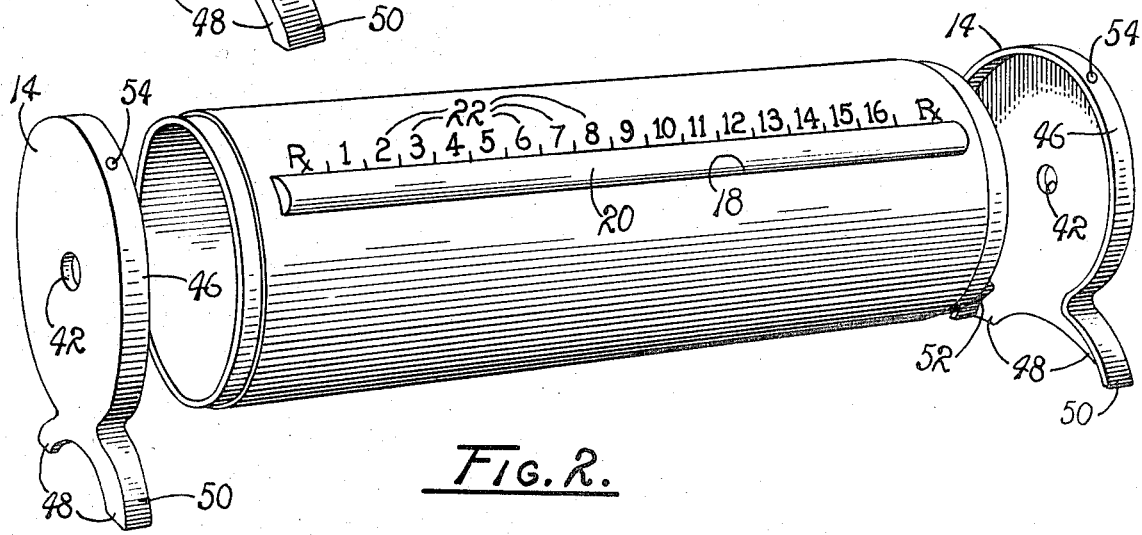
FIG. 2 is an exploded perspective view of the outer tube and the end supports of the display device of FIG. 1.
Figure 3:
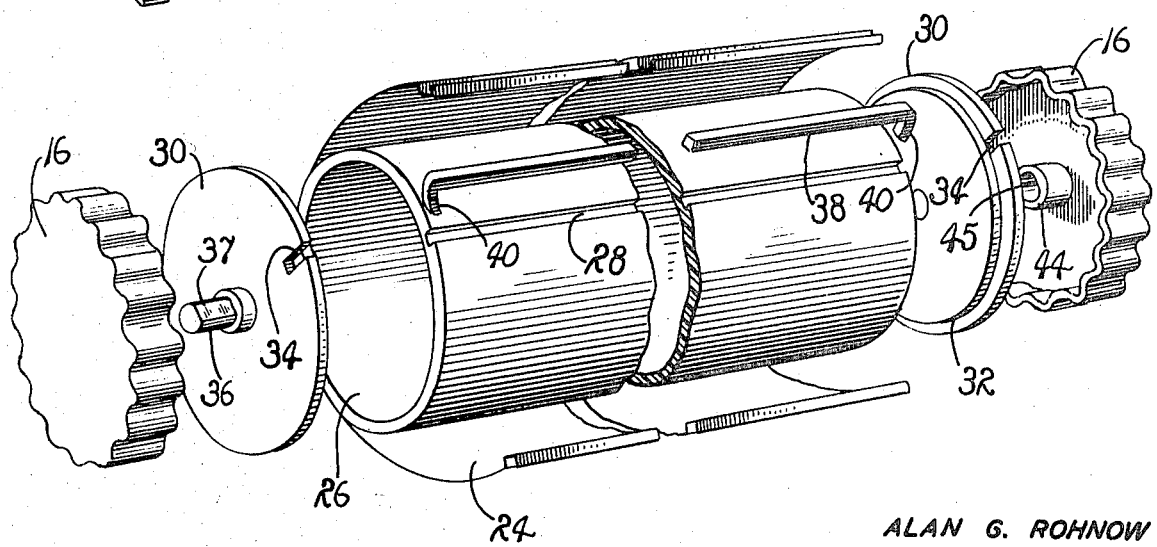
FIG. 3 is a foreshortened exploded perspective view of the information bearing roller illustrating the manner of attaching the information sheet and interlocking the several parts.
Figure 4:
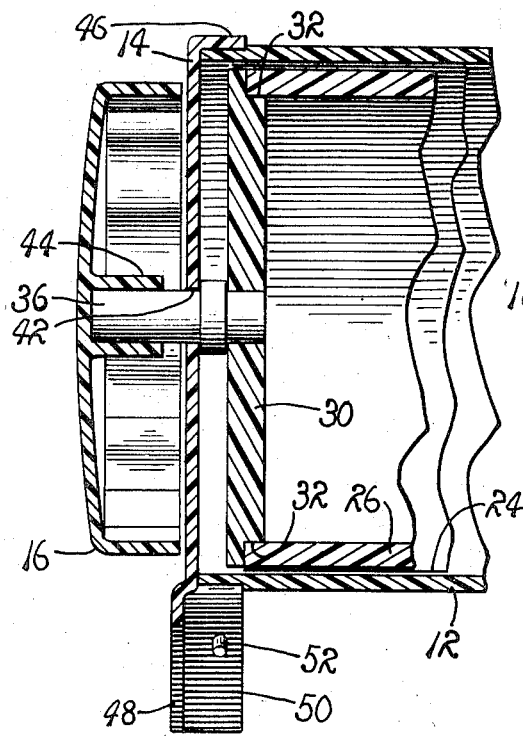
FIG. 4 is a larger scale fragmentary vertical section showing details of construction and the interrelationship of the several parts.
Figure 5:
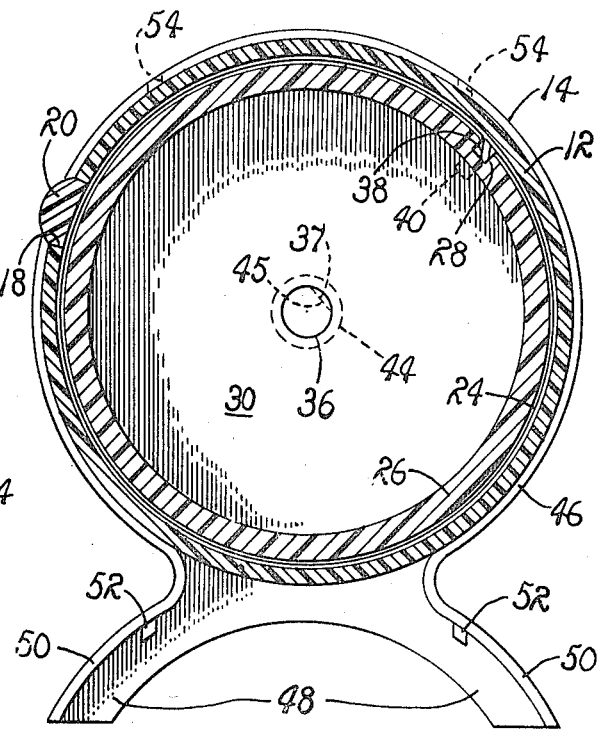
FIG. 5 is a transverse vertical section further illustrating the relationship of the parts.
Figure 6:
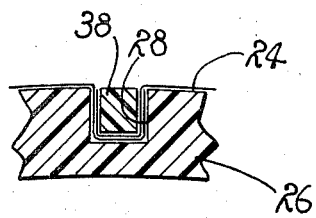
FIGS. 6 and 7 are fragmentary detail views illustrating the interlocking retaining strip and its relationship to other parts.
Figure 7:
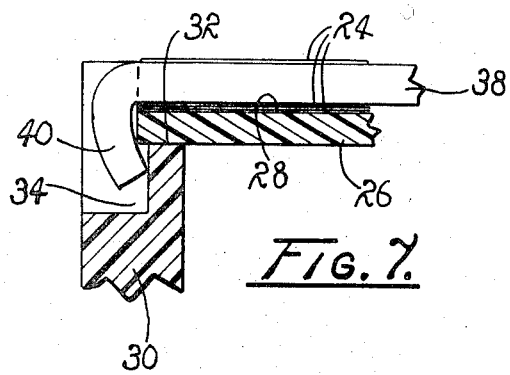

Inviting attention also to FIGS. 2 and 3, the information or data to be presented by the display device is marked upon a page or sheet of paper 24 adapted to be wrapped around an information roller which includes an inner cylindrical tube 26. The tube 26 is formed with a groove 28 of angular cross section coextensive with the length thereof. At the ends of the tube 26 are end plates 30 each having a portion of reduced diameter 32 receivable in the ends of the tube, as shown in FIGS. 4 and 5, and frictionally fitted thereto. Each end plate 30 also has a notch 34 and a stub shaft 36 formed with a flat 37, the notches being aligned with the groove 28 when the end plates are fitted to the tube 26. As will be appreciated from a viewing of FIGS. 3, 6 and 7, the ends of the sheet of paper 24 are made to overlap at the groove 28 and are held therein by an elongated retaining strip 38 of angular cross section fitting snugly in the groove and having bent ends 40 extending over the ends of the tube 26 and projecting into the notches 36 for interlocking the several parts. Each stub shaft 36 extends through a perforation 42 in the adjacent end support 14 and is journaled therein for supporting the tube 26 for rotation within the tube 12. As shown in FIG. 3, each finger knob 16 is formed with a sleeve 44 having an interior flat 45 matching the flat 37, the stub shafts 34 being frictionally fitted to the sleeves for imparting rotation to the tube 26. The interlock achieved by the flats 37 and 45 and the retaining strip 38 with its bent ends 40 insures unitary rotation of the parts.

The information or data on the sheet of paper 24 is aligned both in columns and transversely thereof so that a transverse line of information is related specifically in a predetermined manner to an item identified by one or more of the heading indicia 22, preferably the indicia over the end columns, for ready identification of the item from either side of the sheet. The information in the columns is arranged so that when the sheet is attached in wrapped around relation to the information roller, the columns will be properly aligned with the indicia heading the columns.

The display device of the present invention has as its particular purpose the presentation of information relating to the costs for different amounts of a medication or the like according to prescription fee schedules. Such amounts may be in the number of capsules, pills, tablets and the like, or in liquid ounces, of a medication being dispensed. However, it will be appreciated that the display device can be utilized to present other types of information.

Figure 8:
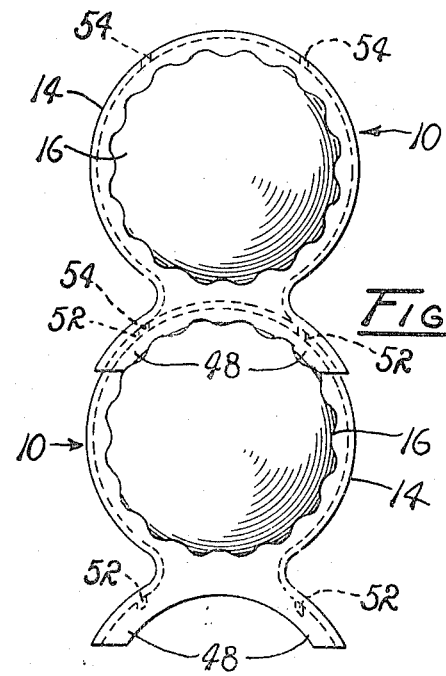
FIG. 8 is an end elevation of a plurality of display devices in accordance with the present invention and illustrating the manner of stacking the same.

Referring to FIGS. 2 and 5, it will be noted that each end support 14 is formed with a convexly curved flange 46 defining the major portion of a circle and a pair of arcuate legs 48 provided with flanges 50 having inwardly disposed concave surfaces with substantially the same degree of curvature as flange 46. The flanges 46 and 50 are similarly curved in order that they provide oppositely facing matching surfaces which can be fitted together for superimposing or stacking one display device upon another as shown in FIG. 8, the flanges 50 together defining less than half a circle. For locking the display devices together in stacked relation, each flange 50 has a projection or stud 52 adapted to be received by and snugly fitted in one of a pair of openings 54 in the flange 46 suitably spaced to receive the studs.

The various parts of the display device of the present invention can be made of any suitable materials, such as plastic, paper, wood and the like, which are readily available and relatively inexpensive. To the extent possible, advantage is taken of conventional shapes, such as tubes, cylinders, plates, rods, and the like.

OPERATION

The operation of the device of the present invention is believed to be clearly apparent and is briefly summarized at this point. Starting with the parts disassembled, as shown in FIGS. 2 and 3, the end plates 30 are fitted to the tube 26 with the notches 34 aligned with the groove 28. The sheet of paper 24 bearing the information or data desired to be displayed is wrapped around the tube 26 with the ends of the paper disposed in overlapping relation over the groove 28 after which the retaining strip 38 is fitted into the groove for locking the parts together. The assembled parts are then inserted into the tube 12 to which the end supports 14 are fitted with the stub shafts 34 extending through the journal perforations 42. Fitting the sleeves 44 of the finger knobs 16 to the stub shafts 36 completes the assembly of the device. To ascertain the cost of a predetermined amount of a medication, one of the finger knobs 16 is turned until the prescription for the medication desired is seen through the magnifying lens 20 at one of the end columns for identifying the desired line of data, the cost being found in the column under the heading indicia 22 pertaining to the amount of medication. Where the prescription fee schedules are numerous, a plurality of sheets of paper and display devices are employed to display the information pertaining thereto and the devices may be stacked vertically by fitting the studs 52 on one display device in the apertures 54 of a display device disposed therebelow.

There has thus been provided a compact display device of relatively inexpensive construction operable in a facile and rapid manner for displaying desired data in an easily readable manner from which accurate determinations can be made.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for displaying data comprising an elongated hollow housing having a longitudinally extending window therein and indicia coexistensive with the window; end supports fitted to the ends of said housing; and data bearing means mounted on said end supports for rotation within said housing adapted to present data borne thereby for viewing through said window, said means including an elongated member having a circumferential surface, said surface having a longitudinally extending groove therein, a pair of detachable circular end plates coupled with said elongated member, each end plate having a notch aligned with said groove, sheet material encompassing said member in wrap around relation having overlapping ends disposed in said groove, said material having data thereon substantially coexistensive with said window and viewable therethrough, said data being divided into columns headed by said indicia; and retaining means disposed in said groove and the notch of each plate for holding the ends of the sheet material therein and retaining the sheet material in said wrap around relation.

2. The device of claim 1 wherein said end supports have oppositely disposed predetermined upper and lower surfaces, said surfaces having complementary configurations whereby a plurality of said devices can be stacked with complementary surfaces of adjacent devices interfitted to interlock the devices in the stack.

3. The device of claim 1 wherein said end supports each has a pair of spaced legs providing a concavity therebetween and an oppositely disposed convexity, said concavity and convexity being of complementary configuration whereby a plurality of the devices can be stacked with the concavities of the superimposed devices fitted downwardly upon the convexities of the devices therebelow.

4. The device of claim 3 wherein said concavities and convexities are provided with interlocking means adapted to accommodate an interlocking of the end supports with adjacent end supports of a similar type.

5. A device particularly adapted to be employed as one of a plurality of adjacent similar devices for displaying data including an elongated housing and supporting standards connected to the ends of said housing, each standard having a planar end member and an arcuately segmented peripheral flange angularly related to the end member, said flange definnig along a major segment thereof a major portion of a circle and terminating in a pair of oppositely spaced arcuate terminal segments defining therebetween a minor portion of a circle, whereby the major segment of the standard can be received between spaced terminal segments of an adjacent similar standard, while the terminal segments of the standard can receive therebetween a major segment of an adjacent similar standard.

6. The device of claim 5 wherein each flange includes means for interlocking said device with an adjacent similar device and maintaining the same in a predetermined relationship.

7. The device of claim 6 wherein said means for interlocking said device with an adjacent similar device includes means defining an aperture in said flange and a stud projecting from the flange.

8. In a display device; a roller comprising a cylindrical member having detachable circular end plates, each end plate having a shaft coaxially extended therefrom, said member having a longitudinally extending groove, each end plate having a notch aligned with said groove; sheet material removably wrapped around said member and having overlapping ends disposed in said groove, and retaining means fitted in said groove and notches for retaining the sheet material and end plates in assembled relation.

9. The device of claim 8 wherein said groove is of angular cross section, and said retaining means comprises a strip having a similar angular cross section frictionally fitted to the groove with the ends of the sheet material disposed therein.

10. The device of claim 8 wherein said retaining means comprises an elongated strip having ends disposed beyond said surface and directed inwardly therefrom into said notches with the strip tensioned therebetween.

References Cited
UNITED STATES PATENTS

| | | | |
|---|---|---|---|
| 973,403 | 10/1910 | Boling | 235—87 |
| 729,736 | 6/1903 | Collamore | 40—86 |
| 2,115,353 | 4/1938 | Walmsley | 40—77.8X |
| 2,558,538 | 6/1951 | Chambers | 40—77 |
| 3,358,396 | 12/1967 | Prince | 40—77X |
| 3,424,872 | 1/1969 | Whitlock et al. | 35—35.3X |

WILLIAM H. GRIEB, Primary Examiner

U.S. Cl. X.R.

35—77